United States Patent
Lee

(10) Patent No.: US 9,778,755 B2
(45) Date of Patent: *Oct. 3, 2017

(54) IMAGE PROCESSING SYSTEM USING POLARIZATION DIFFERENCE CAMERA

(71) Applicant: Moon Key Lee, Seoul (KR)

(72) Inventor: Moon Key Lee, Seoul (KR)

(*) Notice: Subject to any disclaimer, the term of this patent is extended or adjusted under 35 U.S.C. 154(b) by 236 days.

This patent is subject to a terminal disclaimer.

(21) Appl. No.: 14/434,617

(22) PCT Filed: Oct. 10, 2013

(86) PCT No.: PCT/KR2013/009040
§ 371 (c)(1),
(2) Date: Apr. 9, 2015

(87) PCT Pub. No.: WO2014/058234
PCT Pub. Date: Apr. 17, 2014

(65) Prior Publication Data
US 2015/0286289 A1    Oct. 8, 2015

(30) Foreign Application Priority Data

Oct. 11, 2012  (KR) .................. 10-2012-0113232
Oct. 22, 2012  (KR) .................. 10-2012-0117563

(51) Int. Cl.
*G06F 3/00* (2006.01)
*G06F 3/03* (2006.01)

(52) U.S. Cl.
CPC ............ *G06F 3/0304* (2013.01); *G06F 3/005* (2013.01)

(58) Field of Classification Search
CPC ........ G06F 3/005; G06F 3/0304; H04N 13/04
See application file for complete search history.

(56) References Cited

U.S. PATENT DOCUMENTS

| 7,525,565 B2 | 4/2009 | Van Geest |
| 7,537,161 B2 | 5/2009 | Mayer et al. |
| 8,217,997 B2 | 7/2012 | Solomon et al. |
| 2001/0010514 A1 | 8/2001 | Ishino |
| 2010/0103099 A1 | 4/2010 | Lee |
| 2010/0177184 A1 | 7/2010 | Berryhill et al. |

(Continued)

FOREIGN PATENT DOCUMENTS

| CN | 1668478 A | 9/2005 |
| CN | 1762157 A | 4/2006 |

(Continued)

OTHER PUBLICATIONS

Korean Intellectual Property Office; International Search Report and Written Opinion in International Patent Application No. PCT/KR2013/009040 (Jan. 17, 2014).

(Continued)

*Primary Examiner* — Alexander Eisen
*Assistant Examiner* — Cory Almeida
(74) *Attorney, Agent, or Firm* — Leydig Voit and Mayer

(57) ABSTRACT

A fast and stable image processing system detecting a mark from a polarization image is described. The system includes a camera capturing separately a first polarization image and a second polarization image, and an image processing device outputting a difference image of the first polarization image that is captured and the second polarization image that is captured.

19 Claims, 2 Drawing Sheets

(56) References Cited

U.S. PATENT DOCUMENTS

| | | |
|---|---|---|
| 2010/0200649 A1 | 8/2010 | Callegari et al. |
| 2012/0038668 A1 | 2/2012 | Kim et al. |
| 2012/0268602 A1 | 10/2012 | Hirai et al. |

FOREIGN PATENT DOCUMENTS

| | | |
|---|---|---|
| CN | 101686820 A | 3/2010 |
| CN | 102377873 A | 3/2012 |
| CN | 102421002 A | 4/2012 |
| JP | 7-121293 A | 5/1995 |
| JP | 8-95157 A | 4/1996 |
| JP | 8-249471 A | 9/1996 |
| JP | 2001-249008 A | 9/2001 |
| JP | 2001-325069 A | 11/2001 |
| JP | 2004-7246 A | 1/2004 |
| JP | 2005-148560 A | 6/2005 |
| JP | 2010-539557 A | 12/2010 |
| JP | 2011-164246 A | 8/2011 |
| JP | 2011164246 | * 8/2011 ............... G02F 1/13 |
| JP | 2012-80285 A | 4/2012 |
| JP | 2012080285 | * 4/2012 ............ H04N 5/225 |
| KR | 10-2008-0041623 B1 | 1/2008 |
| KR | 10-2010-0017280 A | 2/2010 |
| KR | 10-2012-0085935 A | 8/2012 |
| WO | WO 2011/083433 A1 | 7/2011 |
| WO | WO 2012/026777 A2 | 3/2012 |

OTHER PUBLICATIONS

State Intellectual Property Office of the People's Republic of China; Office Action in Chinese Patent Application No. 201380053070.7 (Jul. 18, 2016).

Japanese Patent Office; Office Action in Japanese Patent Application No. 2015-535573 (Jan. 4, 2017).

State Intellectual Property Office of the People's Republic of China; Office Action in Chinese Patent Application No. 201380053070.7 (Feb. 23, 2017).

* cited by examiner

IMAGE PROCESSING SYSTEM USING POLARIZATION DIFFERENCE CAMERA

CROSS-REFERENCE TO PRIOR APPLICATIONS

This application is a U.S. National Phase application under 35 U.S.C. §371 of International Application No. PCT/KR2013/009040, filed on Oct. 10, 2013, and claims benefit to Korean Patent Application No. KR 10-2012-0113232, filed on Oct. 11, 2012 and Korean Patent Application No. KR 10-2012-0117563, filed on Oct. 22, 2012. The International Application was published in Korean on Apr. 17, 2014 as WO 2014/058234 under PCT Article 21(2). Entirety of the prior applications PCT/KR2013/009040, KR 10-2012-0113232, and KR 10-2012-0117563 are incorporated by reference herein.

TECHNICAL FIELD

The present invention relates to a technology of fast detection of a polarization mark in a non-zero pixel region of a difference image, between the previous frame and the current frame, wherein the previous frame is an image including the polarization mark captured with first polarization light and the current frame is an image captured with second polarization light.

BACKGROUND ART

Mark recognition, pointing, mouse, augmented reality, polarization, camera, difference image, image processing.

DISCLOSURE OF THE INVENTION

Technical Problem

Recently, the pointing technology of capturing by a camera and recognizing the mouse cursor icon from the captured image on a monitor is developed. The objective of present invention is to provide a fast and stable system which can detect the mouse cursor icon among a complex background image.

The other objective of present invention is to solve the problem that a system may confuse an object as the mouse cursor icon when the camera is not capturing the mouse cursor icon in the monitor but capturing the object in a surrounding environment which is not the monitor.

Technical Solution

The embodiments of the present invention describes an image processing system using a polarization difference camera which can detect a mark quickly by outputting two images of different polarization simultaneously onto a monitor screen, capturing the two images with the corresponding different polarization, and comparing the captured two images.

Advantageous Effects

The objective of present invention is to provide a fast and stable system which can detect a mark by outputting two different images of different polarization simultaneously onto the monitor screen, capturing the two images with the corresponding polarization, and comparing the two images. The mark detected by an image processing system of present invention can be used for pointing or augmented reality. The mark also can be used by a robot to recognize the environment. The image processing system of present invention searches the non-zero pixel region of a difference image of the captured two images to detect the mark. If the camera is capturing the nearby object around the monitor then the image processing system stops searching for the mark because there is no region of high possibility to detect the mark in the difference image. Therefore, load on CPU and power consumption can be reduced. If not using the image processing system of present invention, load on CPU and the power consumption is high because the mark is assumed to be exist always in the captured image and the image processing system always tries to detect the mark from the captured image.

BEST MODE FOR CARRYING OUT THE INVENTION

Embodiment 1

Figure 1:
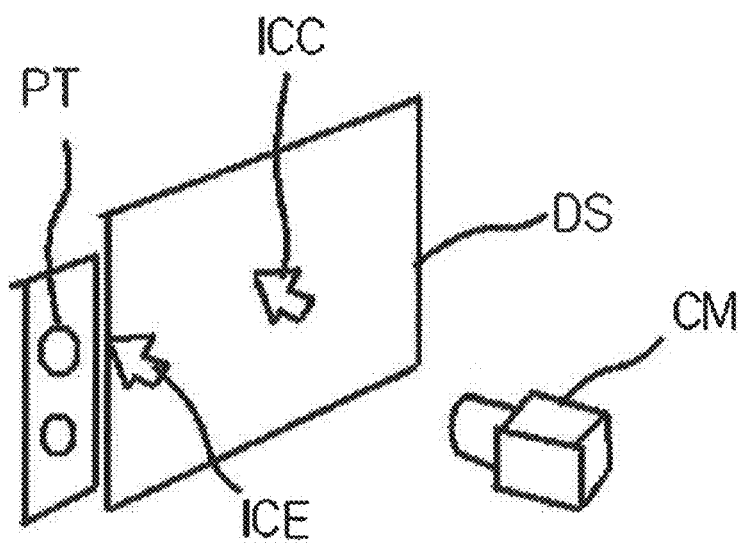
FIG. 1 shows a composition of a system according Embodiment 1.

Recently, the pointing technology of capturing by a camera and recognizing the mouse cursor icon in a monitor from the captured image is developed. For example, there is a technology in Korean Patent Number 10-0936816, entitled "Pointing device using camera and outputting mark." The technology was invented by the inventor of the present invention. This above pointing technology includes an embodiment of image processing system which recognizes the mark from an odd number frame wherein the monitor displays mark image in the odd number frame and displays an ordinary image in an even number frame. As shown in FIG. 1, if the mark is mouse cursor icon ICC, which is located at central region of monitor, and there is sufficient clear margin around the mark, then it is easy to detect the mark. But if the mouse cursor icon ICE is touching the boundary border of monitor screen (DS), and there is an object PT whose texture is similar to that of the mouse cursor icon ICE, then the image processing system may have difficulty in differentiating the mouse cursor icon ICE from the object PT outside of the monitor. Also, if the lens of camera is wide angle lens or if the distance between the camera and the display is long, then the captured image may contain objects around the monitor and the image processing system may have difficulty in detecting the mouse cursor from the captured image.

Figure 2:
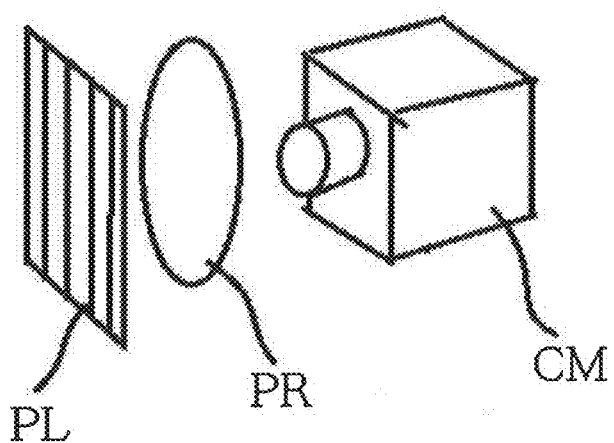
FIG. 2 shows a composition of polarization camera.
Figure 3:
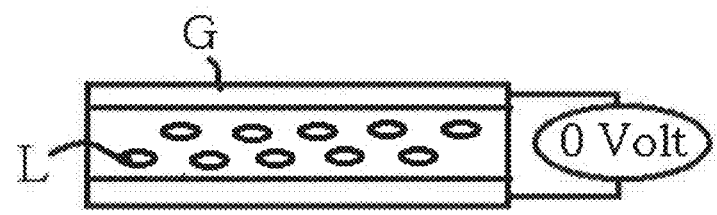
FIG. 3 shows a variable phase retarder film.
Figure 3:
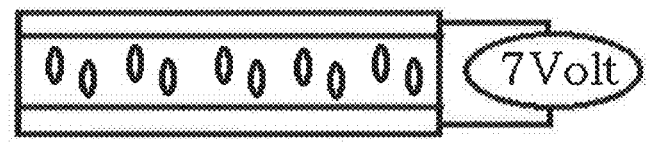

In order to solve the above problems, the present invention provides a fast image processing system with processing that includes: outputting the mark onto the polarization glass type 3-dimensional display (or beam projector) with first polarization light and outputting the ordinary image with second polarization light simultaneously, capturing the first image of the mark that was displayed with the first polarization light and capturing the second image that was displayed with the second polarization light, and detecting the mark from the difference image of the two captured images. The first and second polarization may be circular polarization. The polarization of light incoming to the camera can be adjusted by applying electric voltage to a film of variable phase retarder PR, which is electrically adjustable and attached in front of the camera CM lens with a polarization film PL, as shown in FIG. 2. Such a variable phase retarder PR can be purchased. For example, the web site http://www.arcoptix.com/variable_phase_retarder.htm contains content about the variable phase retarder. As shown in FIG. 3, the above phase retarder PR has the liquid crystal L filled between the two glass substrates G, which are coated with alignment films and transparent conducting terminals. By applying an electric voltage between the transparent conducting terminals, the amount of phase retarding can be adjusted. If there is no electric voltage (0 volt) applied between the conducting terminals, the liquid crystal L is aligned parallel to the glass substrates as shown in top of FIG. 3, and the variable phase retarder PR produces the maximum amount of the phase retarding. And if the applied voltage increased, (for example to 7 volt as shown in bottom of FIG. 3), the amount of phase retarding is decreased by changing the direction of liquid crystal such that the angle between the alignment of liquid crystal L and the glass substrates is perpendicular. By applying the voltage to the variable phase retarder film, linear polarization can be transformed to circular polarization and the direction of polarization can be changed. Therefore the camera can capture the image with specific polarization by applying the voltage to the variable phase retarder.

From the captured images, the object PT outside of the monitor (polarization glass type 3-dimensional display monitor) can be distinguished as following: capturing the mark with first polarization obtained by applying first electric signal to the variable polarization film (variable phase retarder PR and polarization film PL), capturing the ordinary image with second polarization obtained by applying second electric signal to the variable polarization film, calculating the difference image between the above two captured images, and detecting the zero valued pixels from the difference image.

The pixel value of the object PT outside of the monitor is zero because the object PT is captured in both of the two images. The pixel value of difference image is the difference of corresponding two pixel values of input images. For example, pixel value of difference image whose coordinate is (x,y) is the difference between the pixel values of two input images at coordinates (x,y). The interior region of monitor is captured as difference images with different polarizations, and the difference values of the interior region of monitor are non-zero.

Figure 4:
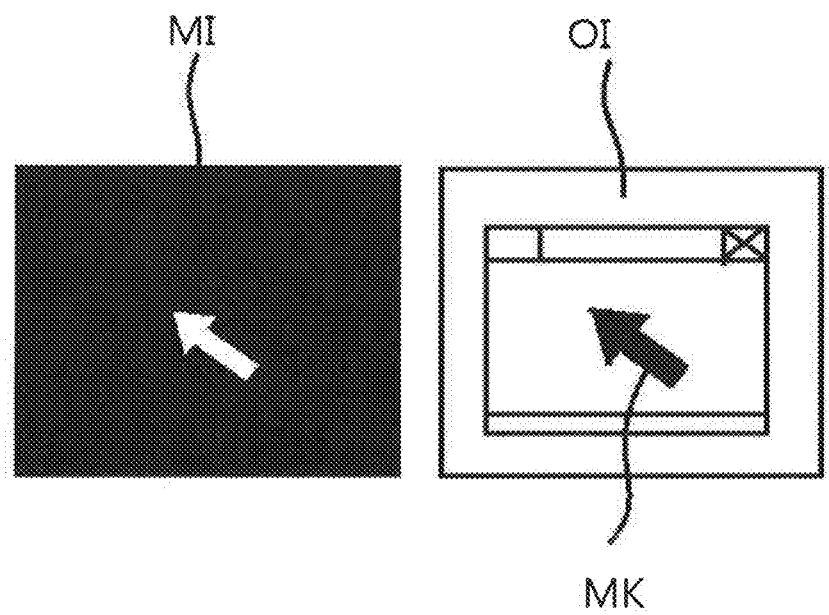
FIG. 4 shows a mark image and an ordinary image.

In order to detect the mark easily by difference, it is recommended to decrease the brightness of the region of ordinary image OI, wherein the region corresponds to the mark MK. The corresponding regions of two images mean that the corresponding regions overlap each other if the two images are superimposed. For example, if the brightness of region MK of ordinary image is decreased as shown in FIG. 4, wherein the region corresponds to the mark MK, then the difference value is positive. If the difference is defined as subtracting the ordinary image OI from the mark image MI, then the difference value of region around the mark is zero or negative value because the pixel values around the mark in mark image MI is 0 or very small value (dark pixel) and pixel values of corresponding region in ordinary image OI are zero or positive value (bright pixel). Therefore, the positive value pixel regions in difference image have high probability to contain the mark. The mark MK can be easily detected by searching such high probability region in mark image MI captured with first polarization.

In the present invention, the first order difference is defined as the difference between the modified ordinary image and the mark image MI, where the modified ordinary image means that the brightness of the region corresponding to the mark is decreased.

If the camera stands still, then only the pixel values of mark region in difference image are positive values, and the pixel values of the other region around mark are negative or zero values. However, if the camera is moving, then the pixel values at the boundary of the mark and objects around display in the difference image may be positive values. In this case, the mark can be detected by removing the boundary regions of object from the positive pixel valued regions in difference image. In the present invention, such removing of the boundary regions of objects from the first order difference image is defined as the second order difference.

It is recommended to calculate the boundary regions from the mark image MI rather than ordinary image OI because the boundary region from the ordinary image OI may also contain the boundary of object inside of display.

These are summarized as following:
(step 1) capture the mark image displayed with first polarization.
(step 2) capture the modified ordinary image with second polarization wherein the modification means that the brightness of corresponding mark region in ordinary image is decreased.
(step 3) detect the positive pixel value region from the (first order) difference image between the above two captured images.
(step 4) detect the region of boundary of object from the mark image captured in step 1.
(step 5) detect mark from the region which is obtained by removing (second order difference) the boundary regions of step 4 from the positive pixel value region of step 3.

It is recommended to remove a slightly larger region that includes the boundary region in step 5. The faster speed of the motion of camera, it is the better to remove a larger region. In step 4, a Canny edge detector can be used to detect the boundary of object. However, such a detector has a problem that the detected boundary changes according to the given input parameter and threshold value, and the thickness of detected boundary is independent of the speed of motion of camera. In present invention, it recommended to use the following boundary detector by difference rather than a Canny edge detector.

The next table shows the sequence of capture:

TABLE 1

| time | Captured image |
|---|---|
| T − 2 | Mark image 0 |
| T − 1 | Ordinary image 1 |
| T | Mark image 2 |
| T + 1 | Ordinary image 3 |

If the current time is T, it is recommended to use the difference image as boundary image wherein the difference image is calculated between Mark image 0 at time T-2 and the Mark image 2 at time T (In the present invention, such difference image is defined as the boundary image by difference).

By using the above method, the thickness of the detected boundary is proportional to the speed of the motion of camera. It means that the second order difference image is cleaner in step 5 because the thickness of regions of positive pixels in first order difference image and the thickness of the boundary image by difference are almost identical.

If boundary is detected by Canny edge detector in step 4 and the such detected boundary is used in step 5, then the boundary region may not be removed completely because the thickness of such boundary by Canny edge detector is independent of speed of motion of camera, but the thickness of boundary in first order difference image is variable (proportional to the speed of motion of camera).

The mark or mouse cursor icon detected by above method can be used for pointing. In other words, pointing signal can be generated so that the mouse cursor icon moves to the viewing direction of camera.

If user stops pointing and puts the camera on a table, then the camera may capture the object, not the display. In this case, if there is a texture similar to mouse cursor icon around the monitor, then the image processing system of conventional technology, such as disclosed in the Korean Patent Number 10-0936816 may confuse the texture with mouse cursor icon. However, by using difference image algorithm of present invention, the image processing system can recognize that there is no mark because all pixel values of first order difference image are zero and can stop further image processing, such as calculating the second order difference. Namely, program can easily and quickly recognize the nonexistence of mark, stop further processing for mark detection (i.e., step for calculating the second order difference image) and reduce the load on CPU and reduce the power consumption. If the distance between camera and the display is long, then the mouse cursor in the captured image is small and the image processing system may have difficulty in recognizing the small mouse cursor icon. However, the image processing system of present invention can detect the small mouse cursor icon because it is sufficient to detect positive pixels from the second order difference image even if the shape of mouse cursor icon is too small to be recognized. That is, the image processing system of present invention can stably detect mark at farther distance than conventional system.

Today, TV home shopping program displays QR code. Such QR code images, as mark and ordinary images, can be displayed simultaneously with different polarizations respectively on monitor (polarization glass type 3D monitor) and the QR code can be detected by image processing system of present invention. Marks can also be displayed at the four vertices of a display rectangle and can be detected and can be used for augmented reality by calculating the distance and direction between the camera and the marks.

Modes for the Invention

Embodiment 2

The present embodiment is the modification of the embodiment 1.

The embodiment 1 relates to the image processing system that calculates the difference image between two captured images, where the two images are polarized with different polarization, the first image is a composite image of a black blank image (blank image is the image whose all pixel values are identical) and the mark image, and the second image is a modified ordinary image where the brightness of region corresponding to mark is decreased.

In comparison, the present embodiment used the first image and second image wherein the first image is the composite of a first color (for example, red) component image of the mark and a complementary color component image of the first color of the ordinary image, and the second image is the composite of the complementary color component image of the first color of the mark and the first color component image of the ordinary image.

For a given full color image, the first color (for example, red) component image means the image whose all the color component pixel values (red, blue, green) except the first color component (red) are modified to zero. In other words, the red component color image of the given full color image is the image whose blue and green component values are zero and the red component values are unchanged compared to the given full color image.

If such color composed first and second images are displayed simultaneously with different polarization onto polarization glass type 3D monitor, then user's eyes sense it as full color image.

By capturing the above color composed image with first polarization and second polarization filter respectively and selecting the first color component images, the mark image can be obtained from the first polarization image MI as shown in FIG. 4, where the mark region is bright and its background region is dark, and the ordinary image OI can be obtained from the second polarization image OI, where the mark region is dark and the other region is bright. If the (first order) difference image is calculated from the above two captured images (in other words, the difference between the first color component image MI of first polarization image and the first color component image OI of second polarization image), then the pixel values of mark region of difference image are positive and the pixel values of the other region are negative or zero. If the camera is moving, then the boundary of an object outside of monitor may produce the positive difference value. In this case, as shown in embodiment 1, the mark region whose pixel value is positive can be obtained by removing the boundary region from the first order difference image, where the boundary region is obtained by second order difference.

Therefore, a mark can easily be detected by searching the region of positive pixel values from the final difference image wherein the final difference image is obtained by first and second order difference process.

Embodiment 3

A QR code can be displayed onto polarization glass type 3D monitor. On the other hand, making QR code by cutting holes from transparent polarization film is possible and such transparent QR code can be attached on wall. Such transparent QR code can be captured and can be recognized by the method of embodiment 1. For example, white regions of QR code can be cut from transparent polarization film and attached onto white wall. If the attached film is captured with first polarization then the pixels of the holes of the film is white and the film is black. If the attached film is captured with second polarization then the all pixels of the holes and the film are white.

Therefore, by calculating the difference image of the two captured images, QR codes can be detected. Such a transparent polarization QR code can solve the problem that the conventional white and black QR code printed in paper is visually unpleasant.

Such a transparent QR code can encode the information about the latitude and longitude or indoor position coordinate, and the information can be used by autonomous navigation robots (for example, cleaning robots).

Embodiment 4

The previous embodiments relate to the system that captures images sequentially by capturing image with second polarization after capturing image with first polarization. In comparison, two images with different polarizations can be captured simultaneously by using the polarization camera whose image sensor contains first polarization filters on even number pixels and second polarization filters on odd number pixels. Such an image sensor is called a polarization image sensor. Such polarization filter pattern is similar to the primary color (red, blue, green) filter pattern on pixels of an image sensor. Primary color component images can be obtained from the color image captured by a color image sensor. Similarly, a first polarization component image and a second polarization component image can be obtained from the images captured by a polarization image sensor, and the difference image can be calculated from the two polarization component images.

The invention claimed is:

1. An image processing system for processing an image that includes a first polarization image having a first polarization and including a mark image having a mark and a second polarization image having a second polarization that is different from the first polarization and that includes an ordinary image, the image processing system comprising:
 a camera separately capturing the first polarization image and the second polarization image; and
 an image processing device producing a first difference image from differences between the first polarization image that is captured and the second polarization image that is captured, and detecting the mark by searching a non-zero pixel region of the first difference image.

2. The image processing system according to claim 1, wherein the first polarization image and the second polarization image are stereo images displayed by a three-dimension display including a polarizing glass.

3. The image processing system according to claim 2, wherein
 the first polarization image is a composite image of a modified ordinary image and a modified mark image,
 the modified mark image is a first color component image of the mark image,
 the modified ordinary image is an image of a complementary color component image of the ordinary image,
 the complementary color component image has color components complementary to color components of the first color component image,
 the second polarization image is a composite image of the modified ordinary image and the modified mark image,
 the modified ordinary image has the color components of the first color component image,
 the modified mark image has the color components complementary to the color components of the first color component image, and
 the image processing device produces a second difference image from differences between the first color component images of the first polarization image that is captured and the second polarization image that is captured, and detects the mark by searching a non-zero pixel region of the second difference image.

4. The image processing system according to claim 3, wherein the non-zero pixel region of the second difference image is obtained by removing a boundary region of an object from the second difference image.

5. The image processing system according to claim 3, wherein
 the first polarization image includes a mouse cursor icon image as the mark, and
 the image processing device generates a pointing signal by searching the non-zero pixel region of the second difference image to detect the mouse cursor icon image.

6. The image processing system according to claim 3, wherein
 the first polarization image includes a mark image for augmented reality, and
 the image processing device generates an augmented reality image by searching the non-zero pixel region of the second difference image by detecting the mark, and by calculating a three-dimensional relative position and a direction between the camera and the mark.

7. The image processing system according to claim 1 including a transparent polarization film having a first region producing the first polarization and a second region producing the second polarization, wherein the first polarization image is produced through the first region of the transparent polarization film and the second polarization image is produced through the second region of the transparent polarization film.

8. The image processing system according to claim 7, wherein the second region includes at least one hole in the transparent polarization film.

9. The image processing system according to claim 8, wherein one of the first polarization image and the second polarization image includes one of a code and a character representing information, a pattern, or a mark for augmented reality.

10. The image processing system according to claim 7, wherein the second region includes a phase retarding film.

11. The image processing system according to claim 10, wherein one of the first polarization image and the second polarization image includes one of a code and a character representing information, a pattern, or a mark for augmented reality.

12. The image processing system according to claim 1, wherein the non-zero pixel region is obtained by removing a boundary region of an object from the first difference image.

13. The image processing system according to claim 12, wherein the image processing device detects the boundary region of the object using a difference between the first polarization image in a previous frame and the first polarization image in a current frame.

14. The image processing system according to claim 1, wherein the ordinary image is modified to decrease brightness of pixels in the region corresponding to the mark.

15. The image processing system according to claim 1, wherein
 the first polarization image includes a mouse cursor icon image as the mark, and
 the image processing device generates a pointing signal by searching the non-zero pixel region of the first difference image to detect the mouse cursor icon image.

16. The image processing system according to claim 1, wherein
 the first polarization image includes a mark image for augmented reality, and
 the image processing device generates an augmented reality image by searching the non-zero pixel region of the first difference image, by detecting the mark, and by calculating a three-dimensional relative position and a direction between the camera and the mark.

17. The image processing system according to claim 1, wherein the camera selects the polarization of a captured image with an electrical signal.

18. The image processing system according to claim 17, wherein the camera includes a polarization film and a filter with an electrically controlled degree of phase retardation.

19. The image processing system according to claim 1, wherein
the camera comprises an image sensor which comprises first pixel sensors sensing the first polarization and second pixel sensors sensing the second polarization, and
the first pixel sensors and the second pixel sensors are alternately distributed in the image sensor.

* * * * *